US007131184B2

(12) United States Patent
Niggemeyer et al.

(10) Patent No.: US 7,131,184 B2
(45) Date of Patent: Nov. 7, 2006

(54) METHOD OF MANUFACTURING A LONG ROD SHAPED IGNITION TRANSFORMER INTEGRATED IN AN IGNITER UNIT

(76) Inventors: Gert Guenther Niggemeyer, Steinbecker Muehlenweg 95, D-21244 Buchholz (DE); Joerg Niggemeyer, Steinbecker Muehlenweg 95, D-21244 Buchholz (DE)

( * ) Notice: Subject to any disclaimer, the term of this patent is extended or adjusted under 35 U.S.C. 154(b) by 188 days.

(21) Appl. No.: 10/915,729

(22) Filed: Aug. 10, 2004

(65) Prior Publication Data

US 2005/0068142 A1 Mar. 31, 2005

(30) Foreign Application Priority Data

Aug. 11, 2003 (DE) ................................ 203 12 503

(51) Int. Cl.
*H01F 7/128* (2006.01)
*B29C 45/14* (2006.01)

(52) U.S. Cl. ......................... 29/602.1; 29/606; 29/841; 264/272.19

(58) Field of Classification Search ............... 29/602.1, 29/606, 604, 841; 336/90, 96, 92, 212; 264/272.19, 264/272.2
See application file for complete search history.

(56) References Cited

U.S. PATENT DOCUMENTS 5,923,236 A * 7/1999 Rapoport et al. ........... 336/212
6,049,163 A 4/2000 Masuda et al.
6,215,385 B1 * 4/2001 Ogden ...................... 336/90 X

FOREIGN PATENT DOCUMENTS

| | | | | |
|---|---|---|---|---|
| DE | 41 17 288 A1 | | 12/1992 | |
| DE | 298 11 368 U1 | | 9/1998 | |
| JP | 5-121252 | * | 5/1993 | ................ 29/602.1 |

OTHER PUBLICATIONS

Medinger, K.S., "Key Design Features for an Epoxy Potting Formulation", Proceedings of Electrical Electronics Insulation Conference and Electrical Manufacturing Conference, Sep. 1995, pp. 7-10.*

* cited by examiner

*Primary Examiner*—A. Dexter Tugbang
(74) *Attorney, Agent, or Firm*—Flynn, Thiel, Boutell & Tanis, P.C.

(57) ABSTRACT

A coil carrier (1) comprising of an U shaped plastic profile has material thickness which fulfills dielectric strength requirements between the primary (2)and secondary winding. The outside applied primary ribbon turns (2) are bridging the gap of the U coil carrier. The inside fixed wound ferrite rod (3) is located close to the bottom of the U profile. The internal volumes at the closed side of the coil carrier (5) are already filled with glue. The remaining volume inside the ignition transformer can later easily been filled with encapsulating material through shown remaining penetration interstices between the primary turns (4) and two openings at the beginning and the end of the long rod ignition transformer (T) when finally being potted together with the ignition circuitry (C) in the housing (H) in one common process step.

8 Claims, 2 Drawing Sheets

METHOD OF MANUFACTURING A LONG ROD SHAPED IGNITION TRANSFORMER INTEGRATED IN AN IGNITER UNIT

FIELD OF THE INVENTION

The present method relates to manufacturing ignition transformers in combination with igniters for gas discharge lamps. Ignition transformers inside igniters are generating high voltage pulses up to 25 kV. In general these are comprising of a primary- and a secondary coil which wound on a ferrite rod must have adequate dielectric strength against rod and primary coil respectively.

BACKGROUND OF THE INVENTION

Existing ignition transformers are manufactured separately as single components and in a separate production process step before they are subsequently applied in igniter devices later.

Such an ignition transformer already has its full dielectric strength before its further production application. Its assembly mostly consists of a simple tube in which an insulated ferrite rod, carrying a secondary coil layer, is telescoped in. Then the primary coil windings subsequently will be applied on the outer surface of the tube.

Since air caverns could remain inside the assembly, especially between the tube and the secondary coil, and could be ionized which results in undesired losses, this interior space must be potted completely. As a side effect this avoids leakage currents and humidity.

Therefore this ignition transformer is sealed on its bottom and then filled up with encapsulating material from its top side.

Always a potting of the ignition transformer is mandatory, before it is assembled in a device.

Commonly ignition transformers have only one cylindrical or rod shaped ferrite core and therefore have an open non captured outer magnetic field. Rod shaped long coils with an open outer magnetic field have an undefined coupling in terms of an ideal transformer where the transmission ratio could be easily calculated.

Therefore at long rod ignition transformers it is advisable to understand the transformer as a sequential connection of small single transformer sections in series. Under this aspect it is mandatory to evenly distribute all primary ribbon turns as well as all secondary turns along the full size of the rod. This is a major difference to short segmented coil bobbin ignition transformers.

Unfortunately, therefore it is also mandatory to insulate the primary from the secondary windings of the transformer over the full length.

Besides adequate insulation it also must be paid attention to avoid any remaining ionizable air regions between the primary and secondary coil. If the ignition transformer is constructed by means of coil formers the space between secondary winding and coil former must be filled with a liquid, which later will gelatinise or harden.

So far known tube similar coil formers had been used for long rod coils with very small space between tube inner diameter and secondary winding outer diameter. The filling with pasty potting material to displace air with subsequently hardening could only be achieved with corresponding difficulty. Correspondingly ignition transformers with small outer diameter could only be produced with difficulty.

Assignment of this invention is the improved method of manufacturing of a long rod shaped ignition transformer with small diameter.

The method is based on a coil former with a primary outer winding of an ignition transformer which is open on one side along its full length or which is also equipped with channel openings at different sides or places. Thus the penetration of the potting material into the inner sections of long ignition transformers is strongly simplified. In contrast to the cylinder form of the ferrite rod, the coil bobbin, or better, the coil carrier must not necessarily be symmetric as at or at the opened sides of the profile, a high voltage proof insulation is not provided by the coil carrier alone, but instead is provided later in interaction with the highly insulating properties of the potting material.

At the open side respectively through the openings of the coil carrier potting mass is penetrating in the inside of the ignition transformer using the interstices of the primary winding coil turns and the open side of the carrier. The ignition transformer obtains its required dielectric strength later after the common potting process inside the igniter unit case.

Without problems the encapsulating mass can penetrate through the interstices of the primary turns, because the primary winding consists of some large turn to turn spaces which are evenly distributed over a relatively large length of the ignition transformer. Even if a substantially wider flat conductive ribbon is used, there is always sufficient interstice to fill the ignition transformer without problems.

As the circuitry to drive the ignition transformer mostly as one unit has to be potted also, a major production step can be saved if the ignition transformer with its at least one open sided coil carrier is potted in combination with the ignition circuitry as a functional unit in one final process step.

By this method when the ignition transformer is potted together with the circuitry as a component within an igniter case, the coil carrier can be used to hold the inner wound ferrite rod and to fix the outer primary winding. The carrier can be kept simple, e.g. may exist just as a simple U profile. Here it does not matter if this is a rounded or a cornered U profile.

At this manufacturing step of the method attention has to be paid, so that the distance between the primary and the secondary windings at the open parts or ends of the profile is kept sufficiently large that the potting material can provide enough insulation and there is no danger of a direct contact or short due to accidental deforming caused by unwanted touching during assembly.

It will be very helpful if the ferrite rod, wound with the secondary spiral winding of the ignition transformer, is fixed inside with glue mass at the bottom side (opposite to the open side) of the U profile coil carrier. By this means getting out of place can be avoided, and in addition potting through the openings oriented to the sides is further improved.

SUMMARY OF THE INVENTION

An ignition transformer manufactured in accordance with the invention includes a long insulated ferrite rod with a secondary high voltage spiral winding evenly distributed on it without chamber sections. A primary coil former carries a primary winding on it and has a secondary spiral wound ferrite rod fixed inside. The coil former is made of high insulating material with openings at several sides. The primary equal distributed spiral turns jump or cross over the gaps or openings but still keep enough distance between each single primary turn that a remaining area of resulting penetrating holes or channels for a later filling with insulating material is provided.

As a component within an igniter case the most likely position is horizontal. Because there are several penetration holes at different sides of the transformer a filling in horizontal position is now possible. For electric function of the ignition transformer the required complete insulation potting will be processed together with electronic circuitry assembled in the igniter unit saving one major manufacturing step.

DETAILED DESCRIPTION OF THE PREFERRED EMBODIMENTS

Figure 1:
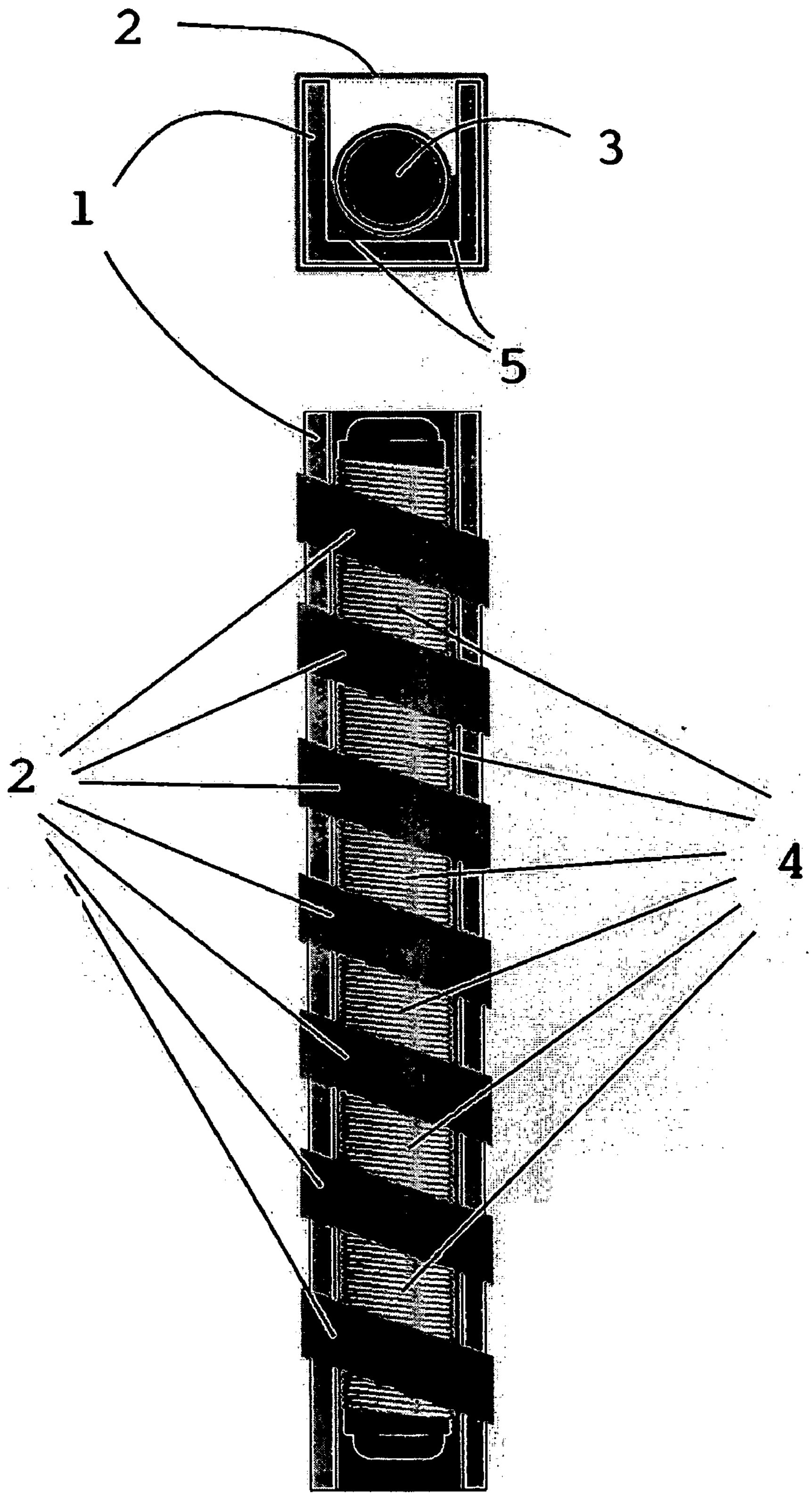
FIG. 1 is a technical drawing showing two views of an example of a non potted ignition transformer according to the invention.

According to the method of manufacturing a not yet potted ignition transformer is shown in FIG. 1: A coil carrier (1) comprising a U shaped plastic profile. The profile material has a thickness which fulfills dielectric strength requirements between the primary (2) and secondary winding. The outside applied primary ribbon winding (2) is bridging the gap of the U coil carrier. The inside located spiral wound ferrite rod (3) is located close to the bottom of the U profile. The channel interstices (4) give free vision to the underlying surface of the spiral wound secondary winding. The internal volumes at the closed side of the coil carrier (5) are already filled with glue fixing mass. The remaining volume inside the ignition transformer can later easily be filled with encapsulating material through six shown remaining penetration channel interstices between the primary turns (4) and two openings at the ends of the long rod ignition transformer.

Figure 2:
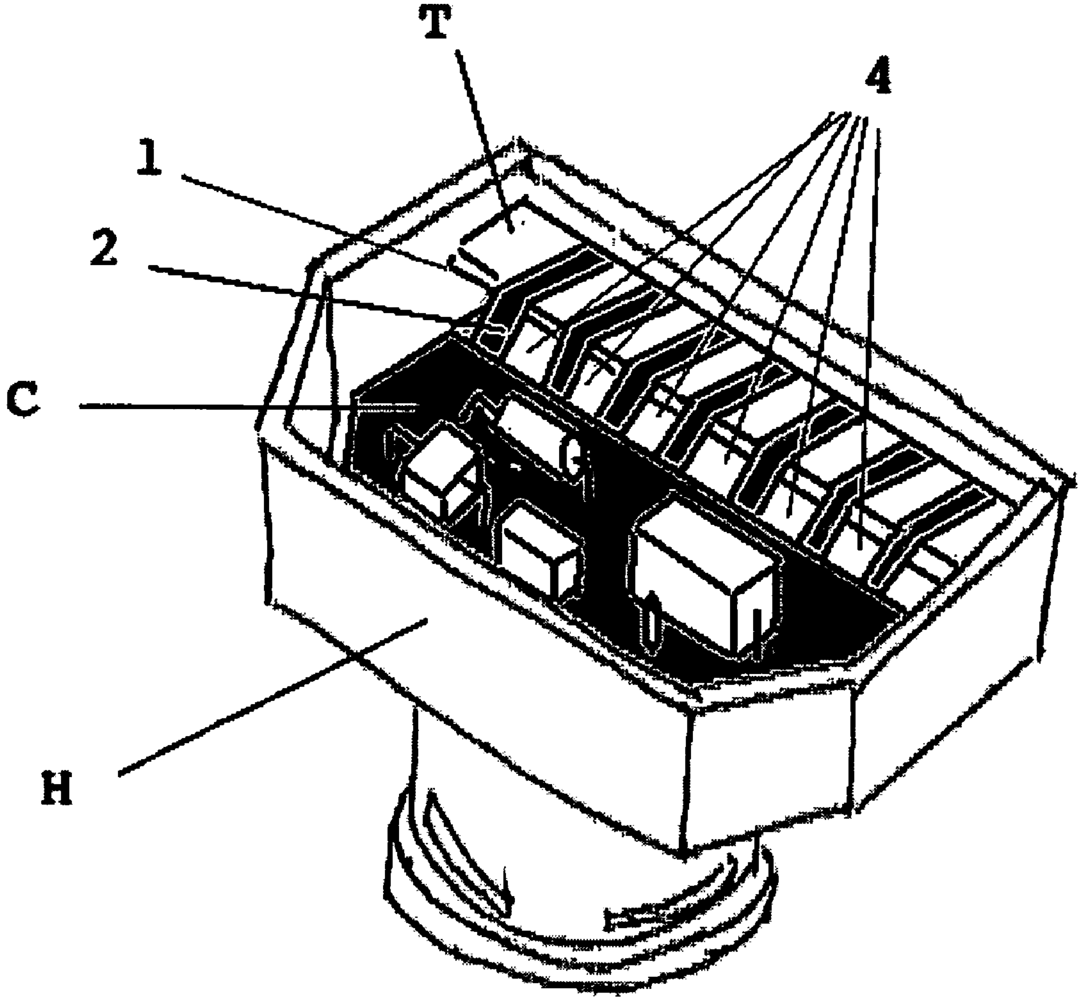
FIG. 2 shows the ignition circuit, including the ignition transformer before the potting material has been added.

The igniter unit, including the ignition transformer is shown in FIG. 2 in a state before the potting material has been added. The transformer (T) is located in a portion of a plastic housing (H), which also accommodates electronic circuit parts (C). This plastic housing (H) is totally filled with liquid potting material to encompass all components in a final process step. The transformer (T) has the penetration openings or channels (4) in a side elevation such that the liquid potting material can easily penetrate into the space within the transformer (T) between the secondary spiral winding and the U-shaped primary coil carrier (1) for encapsulation of all the components within the housing (H) in one common process step.

What is claimed is:

1. A method of manufacturing a long rod shaped ignition transformer integrated in an igniter unit including:

(a) a long shaped primary coil former with an evenly arranged primary spiral winding, and (b) a secondary spiral coil wound along a ferrite rod imbedded within the primary coil former, and (c) the primary coil former for receiving insulating fluid material, and (d) the primary spiral winding having interstices between each turn as penetration channels, and (e) the primary coil former providing minimum distance between the primary winding and secondary coil turns to provide minimum dielectric strength of applied insulation materials, and (f) one step filling of the ignition transformer and an igniter circuit configuration with insulating potting material via the penetration channels which fills a space between the primary spiral winding and the secondary spiral coil.

2. Method in accordance to claim 1, wherein the unit formed by the ferrite rod and the secondary coil is fixed in the primary coil former before potting.

3. Method in accordance to claim 2, wherein the primary spiral winding is wound spiral shaped around the primary coil former as a wire or a ribbon.

4. Method in accordance to claim 3, wherein the primary coil former comprises a U profile coil former wherein the interstices result from the distance between primary spiral winding turns of the primary winding across an open part of the U profile.

5. A method of manufacturing a long rod shaped ignition transformer integrated in an igniter unit comprising the steps of:

providing a hollow elongate shaped primary coil carrier having a gap along a length thereof with a primary winding spirally wrapped about an outer face of the primary coil carrier along the length thereof, the primary winding having open spaces between turns that comprise interstices, the interstices across opening of said primary coil carrier defining a plurality of penetration channels;

embedding a ferrite rod having a secondary coil spirally wound thereabout within the primary coil carrier, the primary coil carrier being sized to provide a minimum distance between the primary winding and the secondary coil to provide a minimum dielectric strength of applied insulation materials; and in one step, filling the ignition transformer and an igniter circuit configuration with insulating potting material through the penetration channels.

6. The method in accordance with claim 5, wherein the ferrite rod and the secondary coil form a unit that is fixed in the primary coil carrier before the step of filling the ignition transformer with insulating potting material.

7. The method in accordance with claim 5, wherein the primary winding comprises a spirally wound wire or ribbon.

8. The method in accordance with claim 6, including providing the hollow elongate shaped primary coil as a U profile coil carrier having the opening extending along the entire length thereof, and wherein the ends of the U profile coil carrier are open.

* * * * *